O. SIEGLER.
COMBINED GAS AND COAL RANGE.
APPLICATION FILED JUNE 8, 1916.
1,307,762.
Patented June 24, 1919.
3 SHEETS—SHEET 1.
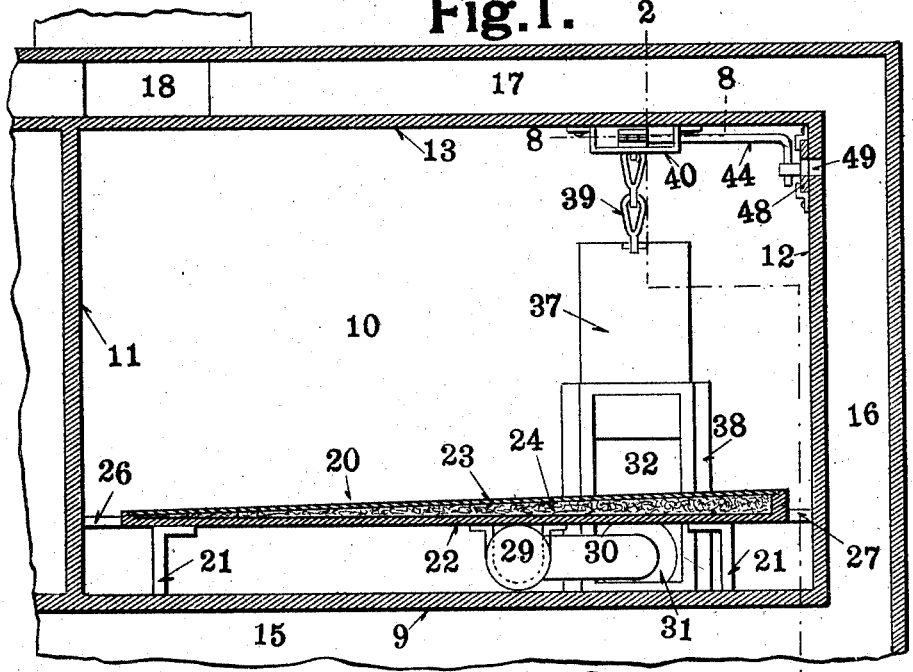
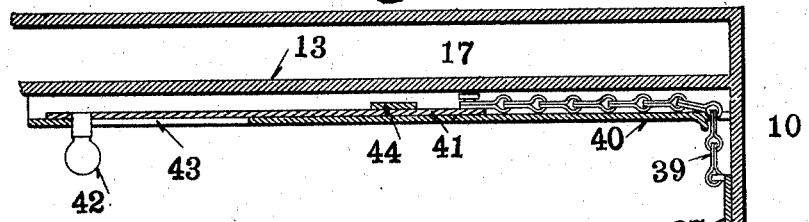
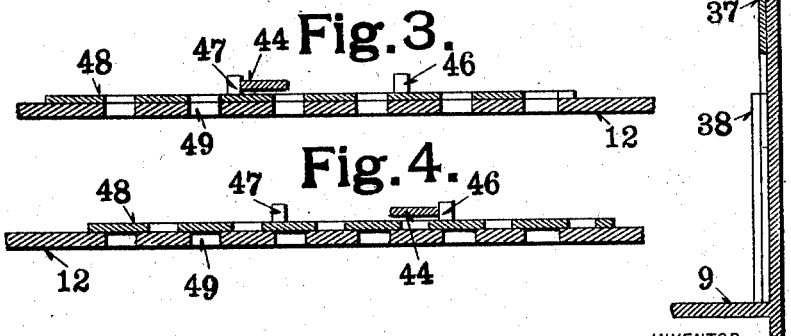
WITNESS
W. A. Alexander,
INVENTOR
O. Siegler.
BY
E. E. Huffman
ATTORNEY

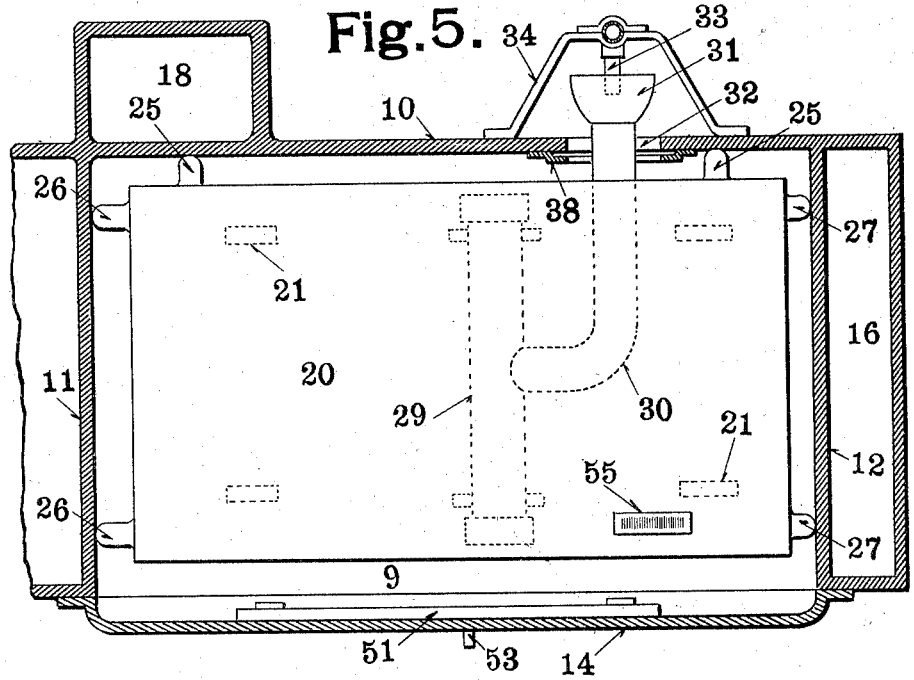
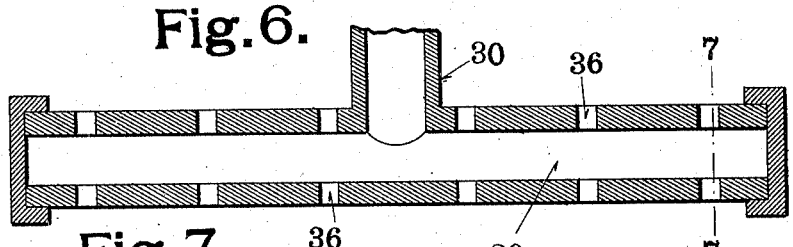
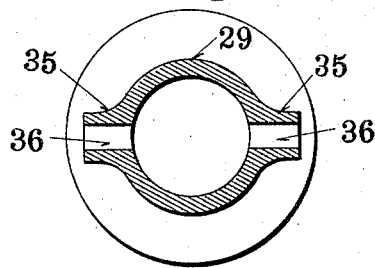

O. SIEGLER.
COMBINED GAS AND COAL RANGE.
APPLICATION FILED JUNE 8, 1916.

1,307,762.

Patented June 24, 1919.
3 SHEETS—SHEET 3.

WITNESS
W. A. Alexander,

INVENTOR
O. Siegler
BY
E. E. Huffman
ATTORNEY

UNITED STATES PATENT OFFICE.

OTTO SIEGLER, OF BELLEVILLE, ILLINOIS.

COMBINED GAS AND COAL RANGE.

1,307,762.  Specification of Letters Patent.  Patented June 24, 1919.

Application filed June 8, 1916. Serial No. 102,424.

*To all whom it may concern:*

Be it known that I, OTTO SIEGLER, a citizen of the United States of America, residing at the city of Belleville, county of St. Clair, State of Illinois, have invented a certain new and useful Combined Gas and Coal Range, of which the following is such a full, clear, and exact description as will enable any one skilled in the art to which it appertains to make and use the same, reference being had to the accompanying drawings, forming part of this specification.

My invention relates to a combined gas and coal range and more particularly to one in which the gas heating attachment may be readily removed and placed in position.

Figure 8:
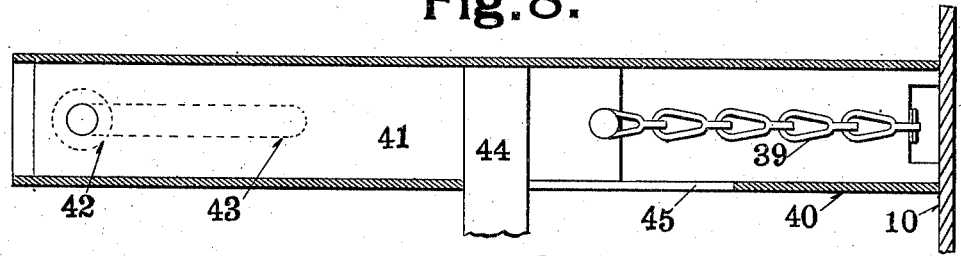
Figure 9:
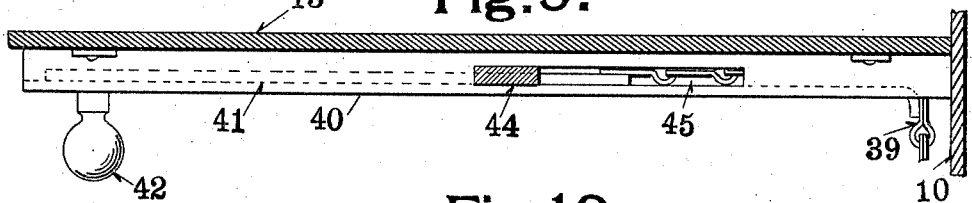
Figure 10:
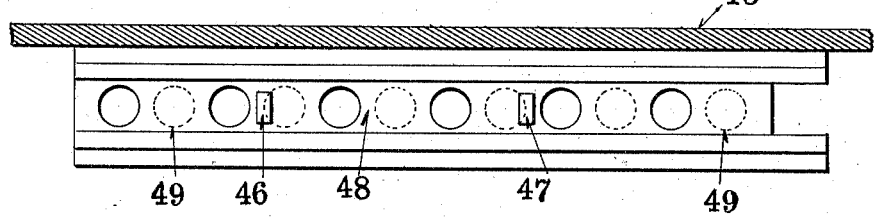
Figure 11:
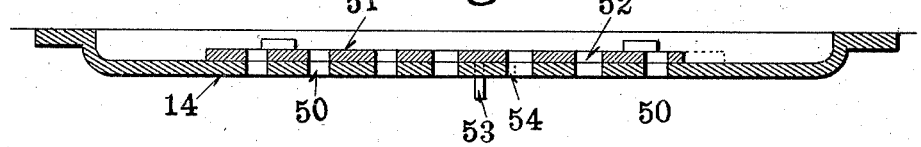

In the accompanying drawings which illustrate so much of a range as is necessary to disclose my invention, Figure 1 is a vertical section through the oven; Fig. 2 is a section taken on the line 2—2 of Fig. 1; Fig. 3 is an enlarged detailed view of the valve for controlling the outlet of air; Fig. 4 is a view similar to Fig. 3, but showing the valve in a different position; Fig. 5 is a horizontal section through the oven; Fig. 6 is an enlarged sectional view of the burner; Fig. 7 is a section taken on the line 7—7 of Fig. 6; Fig. 8 is an enlarged section taken on the line 8—8 of Fig. 1; Fig. 9 is a side view of the parts shown in Fig. 8; Fig. 10 is a detailed view of the valve controlling the outlet of air; and Fig. 11 is a sectional view showing the valve on the oven door.

Like marks of reference refer to similar parts in the several views of the drawings.

The oven which is adapted to be heated either by coal or gas is formed of a bottom 9; back 10; ends 11—12; top 13 and door 14. Passing below the bottom 9 is a flue 15, connected from the fire pot (not shown) which is arranged as is usual adjacent to the end 11 of the oven. This flue 15 communicates with an upwardly extending flue 16 adjacent to the end 12, and the flue 16 in turn communicates with a flue 17, passing over the top 13 of the oven into the chimney flue 18. All of these parts may be of any usual and well-known construction.

Arranged within the oven is a baffle-plate 20 supported on feet 21. This baffle-plate 20 is made thicker at the end adjacent to the wall 12 than at that adjacent to the wall 11, as is best shown in Fig. 1 of the drawings. The baffle-plate is preferably formed of a base 22, of cast metal; a covering 23 of sheet metal and a filling 24 of asbestos or other non-conducting material. In order to insure the proper positioning of the baffle-plate in the oven, I provide it with a pair of lugs 25 adapted to bear against the back 10, and with a pair of lugs 26 adapted to bear against the wall 11, and a pair of lugs 27 adapted to bear against the wall 12. As will be seen in Fig. 5 of the drawings the lugs 26 are considerably longer than the lugs 27, so as to leave an air passage of greater area between the ends of the baffle-plate and the wall 11 than that of the passage between the end of said plate and the wall 12, in order to secure the proper circulation of the heated air, as will be hereinafter more fully set forth. It will be understood that the baffle-plate can be readily removed and placed in any position in the oven.

Secured to the bottom of the baffle plate is a burner 29, shown in detail in Fig. 6. The burner is supplied with gas by an L-shaped pipe 30, the end of which is provided with a mixer 31 and is adapted to project through an opening 32 in the back 10 of the oven. The mixer 31 makes a sliding connection with a gas supply pipe 33 carried in a bracket 34. The burner 29 is provided with thickened portions or ribs at each side, as is shown in Fig. 7, and in these ribs are formed the burner holes 36. The opening 32 not only allows the passage of the mixer 31, but also supplies air to the oven when the same is used in connection with the gas burner. It is necessary, however to close this opening when the range is used as a coal range. In order to close this opening I provide a door 37 sliding in guideways 38. This door 37 is attached to the end of a chain 39, which passes into a shallow trough 40 and is attached to the end of a slide 41, the movement of said slide being controlled by a knob 42 projecting through a slot 43 in the bottom of the trough. The slide 41 has secured to it an arm 44 projecting through a slot 45 in the side of the trough 40. The arm 44 is bent down, as is best shown in Fig. 1 of the drawings, and is adapted to make contact with two lugs 46 and 47 respectively on a valve plate 48 controlling openings 49 formed in the upper part of the wall 12 and adapted to control the flow of heated air from the oven into the flue 16. The distance between the lugs 46 and 47 is such that the valve 48 will only be moved a short distance, as shown in Figs. 3 and 4 of the drawings, while the door 37 will be moved a much greater distance. In order to allow the air to enter at the front of the oven the oven door 14 is provided with openings 50, controlled by a slide 51, provided with a corresponding number of openings 52 and having a lug 53 projecting through a slot 54, so as to be operated from the outside of the oven. 55 is a match-scratcher which is secured on the baffle-plate 20.

The operation of my range is as follows: When it is desired to use the range as a gas range the baffle-plate and attached burner are inserted into position, as best shown in Fig. 5 of the drawings. When the burner 29 is lighted the heated air passes upwardly around the four sides of the baffle-plate. Inasmuch, however, as the space adjacent to the wall 12 is less than that to the wall 11, a considerably greater amount of heated air is caused to pass up adjacent to the wall 11, and this, together with the wedge-shaped section of the baffle-plate secures an even distribution of the heat throughout the oven, as the heat all passes out through the openings 49 into the flue 16.

When it is desired to use the range as a coal range, it is only necessary to withdraw the baffle-plate 20, which can be readily done, as it is not permanently connected at any point, the joint between the mixer 31 and the supply pipe 33 being a slip joint. After the baffle-plate and burner have been removed from the oven the knob 42 is moved rearwardly so as to allow the door 37 to move downwardly in the guides 38, thus closing the opening 32. As the slide 41 reaches the end of its movement the arm 44 will come into contact with the lug 46 and valve 48, thus moving the said valve into the position shown in Fig. 4, closing the opening 49, so that the oven does not communicate with the flue 16, and consequently the gases from the burning coal will be prevented from entering the oven.

It will be seen that my range is simple and effective in operation, and readily changed from a gas range to a coal range.

Having fully described my invention, what I claim as new and desire to secure by Letters Patent of the United States is:

1. In a combined gas and coal range, an oven having a flue extending around the same, a baffle-plate in said oven, a burner under said baffle plate, said baffle-plate having a passage at each end for the heated air, one of said passages being of greater area than the other, an outlet from the oven to said flue, said outlet being formed in the end of the oven adjacent to the smaller passage, and means for opening and closing said outlet.

2. In a combined gas and coal range, an oven having a flue extending around the same, a baffle-plate in said oven, a burner situated substantially centrally under said baffle-plate, said baffle-plate being thicker at one end than at the other, said baffle-plate having a passage at each end for the heated air, the passage adjacent to the thicker end of the baffle-plate being of less area than the other, an outlet from said oven to said flue, said outlet being arranged adjacent to the thick end of said baffle plate, and means for opening and closing said outlet.

3. In a combined gas and coal range, an oven having a flue extending around the same, a baffle-plate in said oven, a burner situated substantially centrally under said baffle-plate, said baffle-plate being thicker at one end than at the other, and an outlet from the oven to the flue arranged adjacent to the thick end of said baffle plate.

4. In a combined gas and coal range, an oven having a flue extending around the bottom and one end thereof, said oven having an opening at the back for the intake of air, a baffle plate in said oven, a burner for said baffle plate and provided with a removable gas pipe extending through said opening, a sliding door for said opening, a passage leading into the flue around said oven, a sliding valve for said passage, a sliding member arranged in the top of the oven, a chain connecting said sliding member with said sliding door, and a laterally extending arm also carried by said sliding member and adapted to operate said valve.

5. In a combined gas and coal range, an oven having a flue extending around the bottom and one end thereof, an oven having an opening at the back for the intake of air, a baffle-plate in said oven, a burner for said baffle-plate and provided with removable gas pipe extending through said opening, a sliding door for said opening, a passage leading into the flue around said oven, a sliding valve for said passage provided with a pair of lugs, a sliding member arranged in the top of the oven, a chain connecting said sliding member with the sliding door, and a laterally extending arm also carried by said sliding member, said arm coöperating with one of said lugs to move said valve in one direction and with the other of said lugs to move said valve in the other direction.

6. In a combined gas and coal range, an oven having a flue extending around the bottom and one end thereof, said oven having an opening at the back for the intake of air, a baffle plate in said oven, a burner for said baffle plate, said burner being provided with removable supply connections extending through said opening in the back of the oven, a sliding door for said opening, a passage leading into the flue, a sliding valve for said passage, a sliding member arranged in the top of the oven, a chain connecting said sliding member with the sliding door controlling the back opening, a laterally extending arm carried by said sliding member, and a plurality of spaced projections carried by said sliding valve, said projections being adapted to be engaged by the arm on said sliding member, whereby said valve is moved a less distance than said sliding member to open and close the passage into the flue.

7. In a combined gas and coal range, an oven having a flue extending around the bottom and one end thereof, said oven having an opening at the back for the intake of air, a baffle plate in said oven, a burner for said baffle plate, said burner being provided with removable supply connections extending through said opening, said baffle plate having an opening for the passage of the products of combustion at each end thereof, one of said openings being larger than the other, a sliding door for the opening in the back of said oven, a passage leading from said oven into the flue, said passage being arranged adjacent to the end of the baffle plate with the smaller opening, a sliding valve for said passage into the flue, a sliding member arranged in said oven, flexible connections between said sliding member and said sliding door, a laterally projecting arm carried by said sliding member, and a pair of spaced lugs carried by said sliding valve and adapted to engage to said arm, whereby said sliding valve is moved a less distance than said sliding member to open and close the passage into the flue.

In testimony whereof, I have hereunto set my hand and affixed my seal.

OTTO SIEGLER. [L. S.]

Copies of this patent may be obtained for five cents each, by addressing the "Commissioner of Patents, Washington, D. C."